United States Patent [19]
Kobayashi

[11] Patent Number: 5,433,635
[45] Date of Patent: Jul. 18, 1995

[54] JET PLATE SENSOR FOR WATERCRAFT

[75] Inventor: Noboru Kobayashi, Iwata, Japan

[73] Assignee: Yamaha Hatsudoki Kabushiki Kaisha, Iwata, Japan

[21] Appl. No.: 69,981

[22] Filed: May 28, 1993

[30] Foreign Application Priority Data

Mar. 12, 1993 [JP] Japan .................. 5-052585

[51] Int. Cl.6 .............................................. B60L 1/14
[52] U.S. Cl. ........................................ 440/2; 440/38
[58] Field of Search ............ 440/2, 38; 114/270; 73/181, 182, 183, 861.65, 861.68

[56] References Cited

U.S. PATENT DOCUMENTS

| 3,164,016 | 1/1965 | Dinsmore | 440/2 X |
| 3,292,373 | 12/1966 | Tado | 440/38 |
| 3,349,615 | 10/1967 | Finkl | 73/861.65 X |
| 4,070,909 | 1/1978 | Carpenter | 73/182 |
| 5,176,548 | 1/1993 | Morgan | 114/270 X |
| 5,244,425 | 9/1993 | Tasaki et al. | 440/38 X |

FOREIGN PATENT DOCUMENTS 61-172897 10/1986 Japan .

Primary Examiner—Sherman Basinger
Attorney, Agent, or Firm—Knobbe, Martens, Olson & Bear

[57] ABSTRACT

A number of embodiments of jet and speed sensor mounting plates that are adapted to be positioned on the hull of a watercraft in underlying relationship to a jet propulsion unit. In each embodiment, a speed sensing device is affixed to the plate and constructions are provided for protecting the speed sensor if an underwater obstacle is struck or if the watercraft is beached.

6 Claims, 7 Drawing Sheets

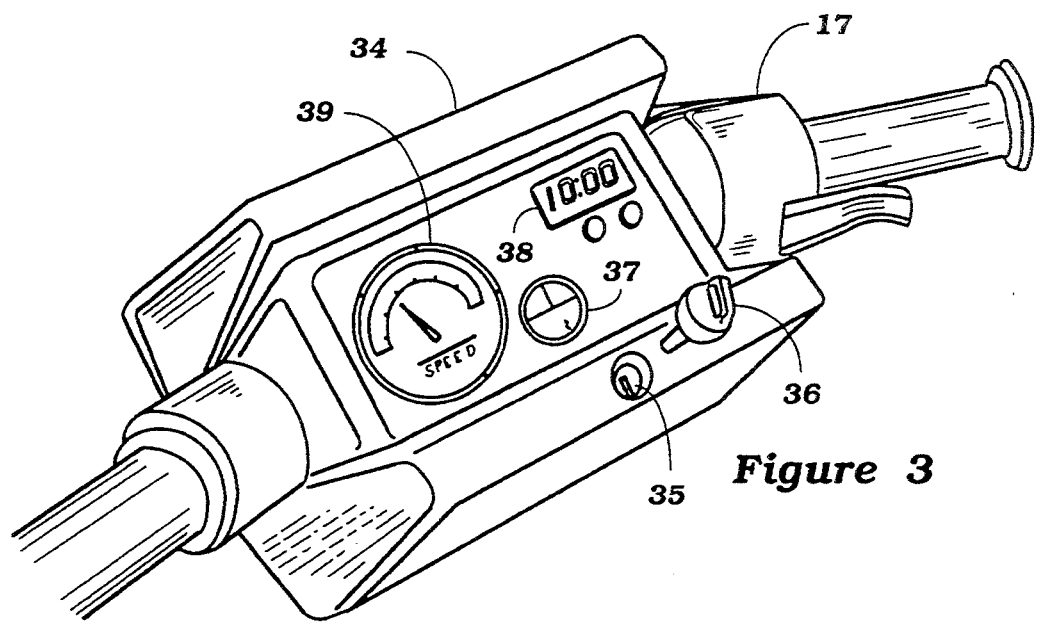
Figure 3
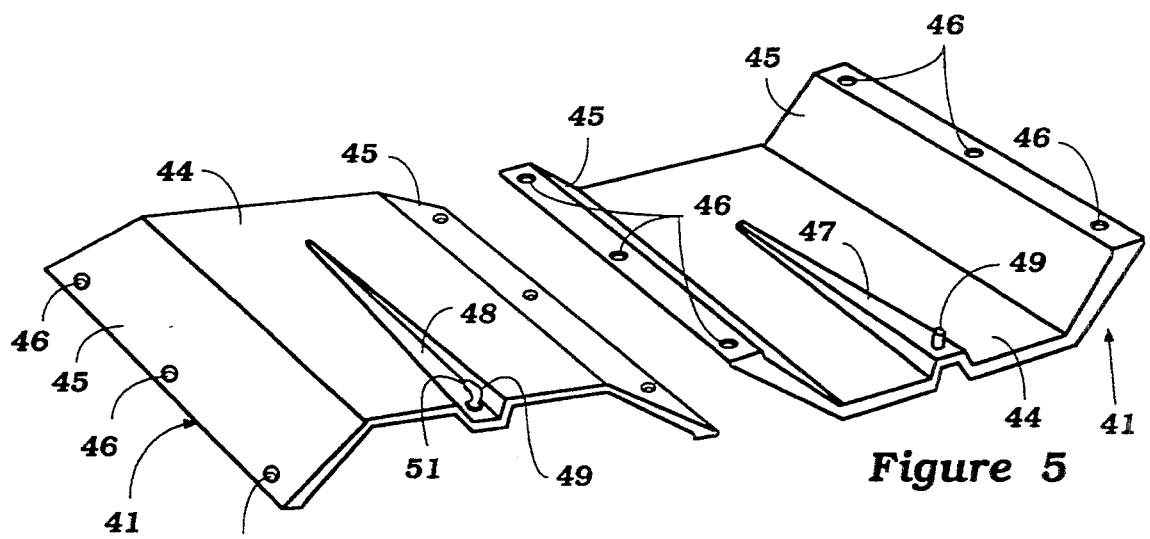
Figure 4
Figure 5
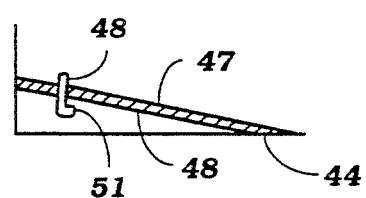
Figure 6

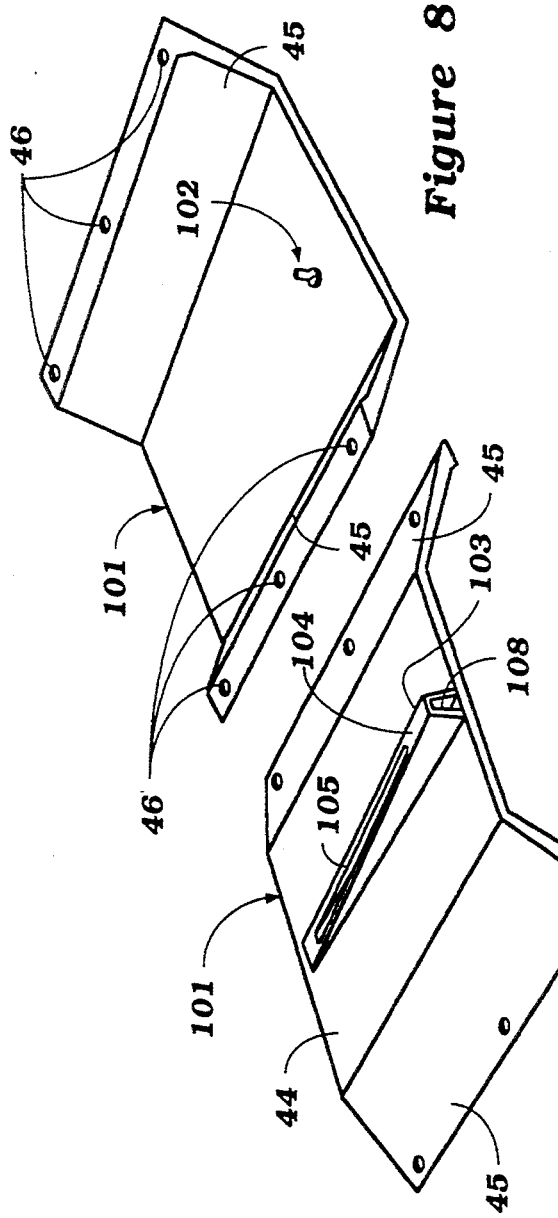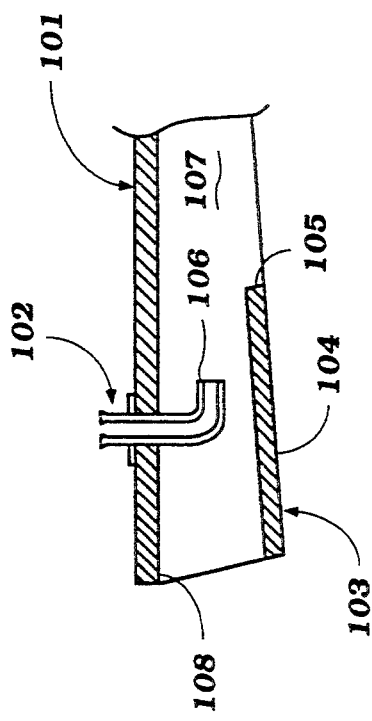

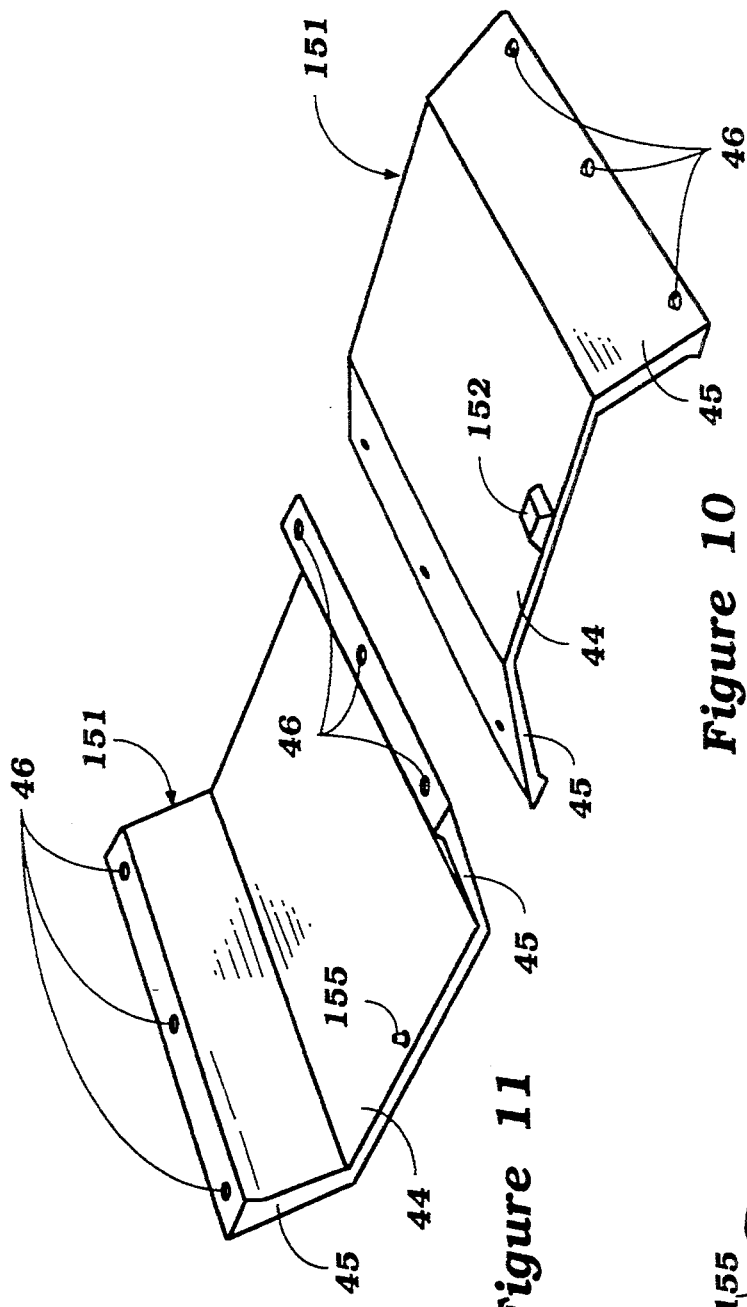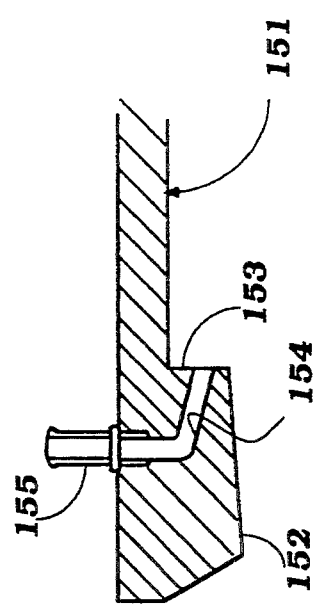

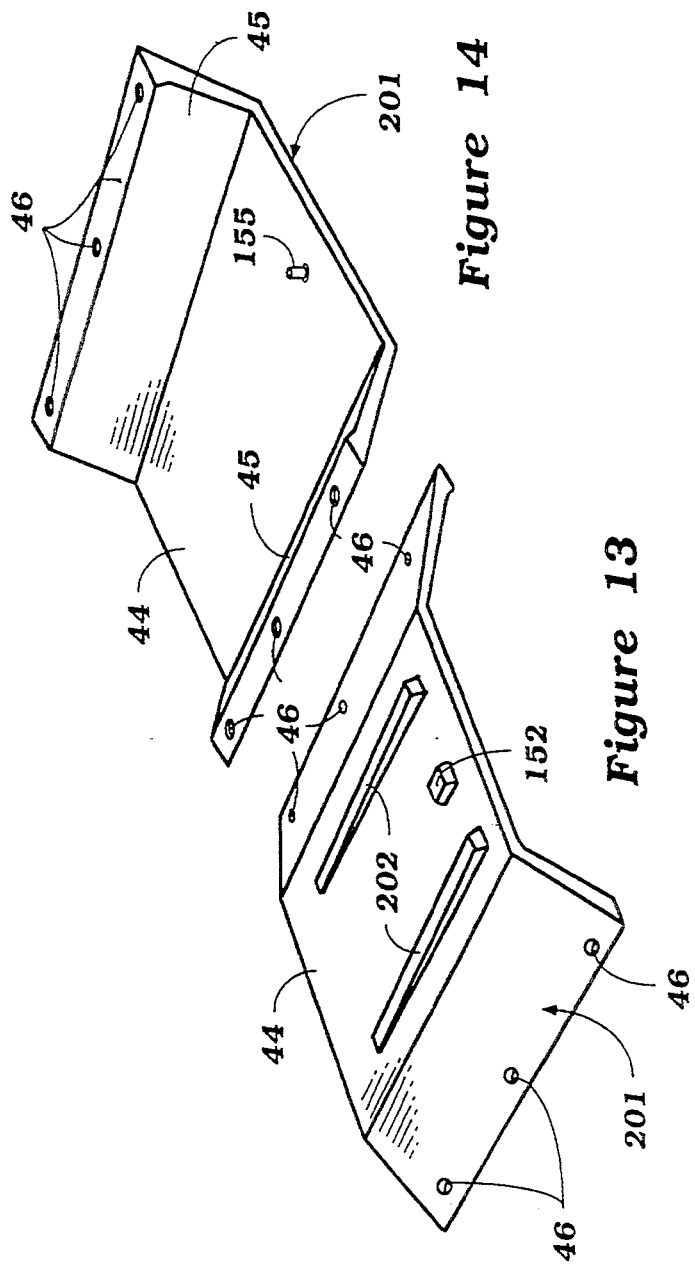
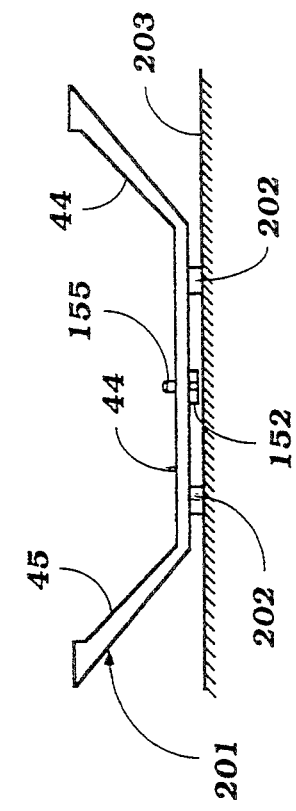

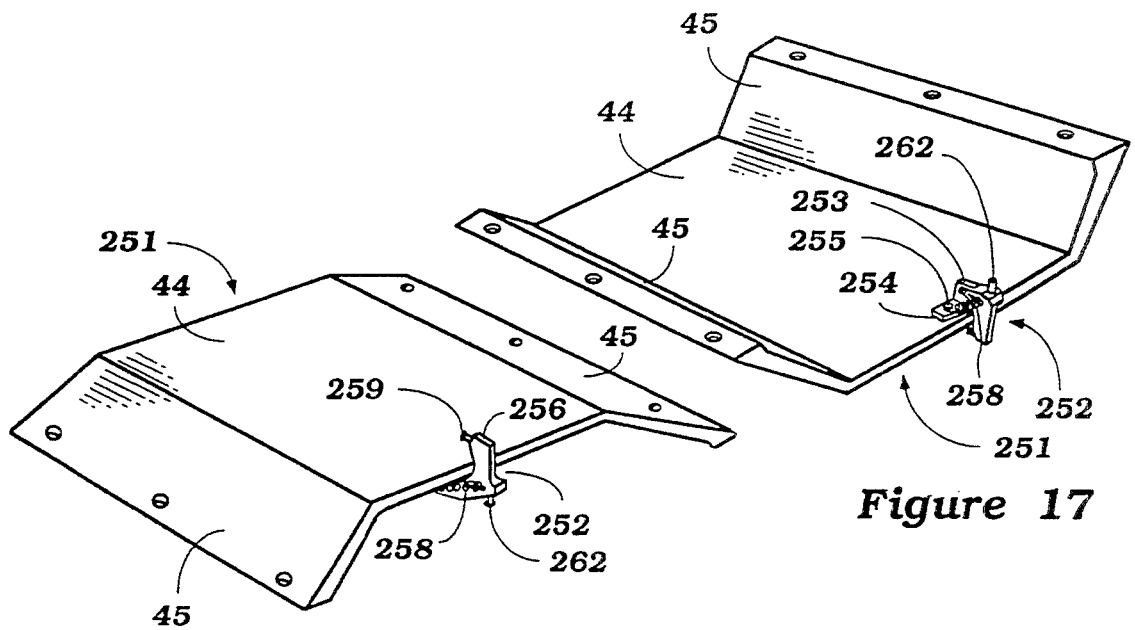
Figure 16
Figure 17
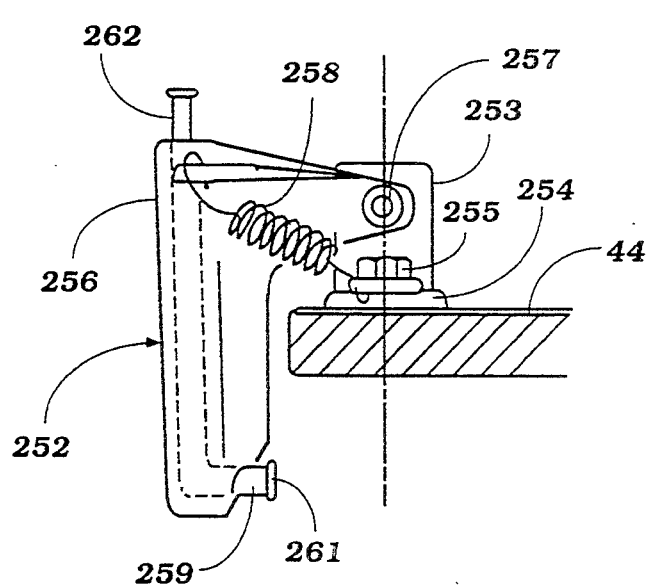
Figure 18

JET PLATE SENSOR FOR WATERCRAFT

BACKGROUND OF THE INVENTION

This invention relates to a speed sensor for a watercraft and more particularly to an improved mounting arrangement for a watercraft speed sensor.

A wide variety of devices have been proposed for indicating watercraft speed. One of the most effective and simplest watercraft speed indicators employs a forwardly facing water inlet opening that is submerged in the body of water in which the watercraft is operating and which is adapted to be impacted by the dynamic water pressure as the watercraft travels through a body of water. Some arrangement is provided for sensing the water pressure at this opening and converting the sensed pressure into a speed indication positioned in proximity to the operator. Although this type of speed sensor has a number of advantages, there are some disadvantages with it.

One of the main disadvantages of this type of speed sensor is the arrangement which must be employed for mounting the speed sensing pressure pick up. Normally this is done by affixing the pressure pick up at a location relative to the hull and wherein it will be submerged in the body of water in which the watercraft is operating at all times. If the speed sensor is so mounted, then it may very well be positioned in an area where it can be easily damaged. This is particularly true if the watercraft is of a type which is frequently beached, as is often times the case.

In addition to the aforenoted problems in the original mounting of the watercraft speed sensor, it is also desirable that the sensor be mounted in such a way that it can be easily disassembled from the watercraft and replaced and/or serviced. The prior art type of sensor mountings simply have not offered these possibilities and have presented the problems aforenoted.

It is, therefore, a principal object of this invention to provide an improved watercraft speed sensor.

It is a further object of this invention to provide a mounting arrangement for a watercraft speed sensor that will permit the speed sensor to be protected, even if the watercraft is being beached and which will afford ease of removal for servicing and/or replacement.

The problems as aforenoted are particularly present in connection with speed sensors for jet propelled watercraft. Jet propelled watercraft are of a type which are frequently beached, particularly when used in conjunction with small personal type watercraft. In addition, it is desirable to mount the speed sensor in such a way that the discharge from the jet propulsion unit of the watercraft will not adversely affect the speed signal.

It is, therefore, a still further object of this invention to provide an improved speed sensing arrangement for a jet propelled watercraft.

It is another object of this invention to provide an improved speed sensor and mounting arrangement that may be employed in conjunction with jet propelled watercraft.

SUMMARY OF THE INVENTION

This invention is adapted to be embodied in the speed sensor arrangement for a jet propelled watercraft that is comprised of a hull that defines an area for receiving a water jet propulsion unit. A plate is affixed to the hull and underlies, at least in part, the jet propulsion unit. A speed sensor for a speed sensing system is affixed to the plate.

BRIEF DESCRIPTION OF THE DRAWINGS

FIG. 3 is an enlarged perspective view showing the speed indicator.

FIG. 4 is an enlarged bottom perspective view of the jet plate and speed sensor in accordance with a first embodiment of the invention.

FIG. 5 is a perspective view showing the plate and speed sensor in its normal position.

FIG. 6 is an enlarged cross sectional view showing the speed sensor and how it is mounted in the jet plate.

FIG. 7 is a bottom perspective view, in part similar to FIG. 4, and shows another embodiment of the invention.

FIG. 8 is top perspective view of this embodiment.

FIG. 9 is an enlarged cross sectional view showing the speed sensor and its mounting arrangement.

FIG. 10 is a bottom perspective view, in part similar to FIGS. 4 and 7 and shows another embodiment of the invention.

FIG. 11 is a top perspective view of this embodiment.

FIG. 12 is a cross sectional view showing the speed sensor mounting.

FIG. 13 is a bottom perspective view of a jet plate and speed sensor, in part similar to FIGS. 4, 7 and 10 and shows another embodiment of the invention.

FIG. 14 is a top perspective view of this embodiment.

FIG. 15 is a cross sectional view showing how the speed sensor of this embodiment is protected when the watercraft is beached.

FIG. 16 is a bottom perspective view of a jet plate and speed sensor, in part similar to FIGS. 4, 7, 10 and 13 and shows a further embodiment of the invention.

FIG. 17 is a top perspective view of this embodiment.

FIG. 18 is a cross sectional view showing a speed sensor and mounting arrangement of this embodiment.

DETAILED DESCRIPTION OF THE PREFERRED EMBODIMENTS OF THE INVENTION

Figure 1:
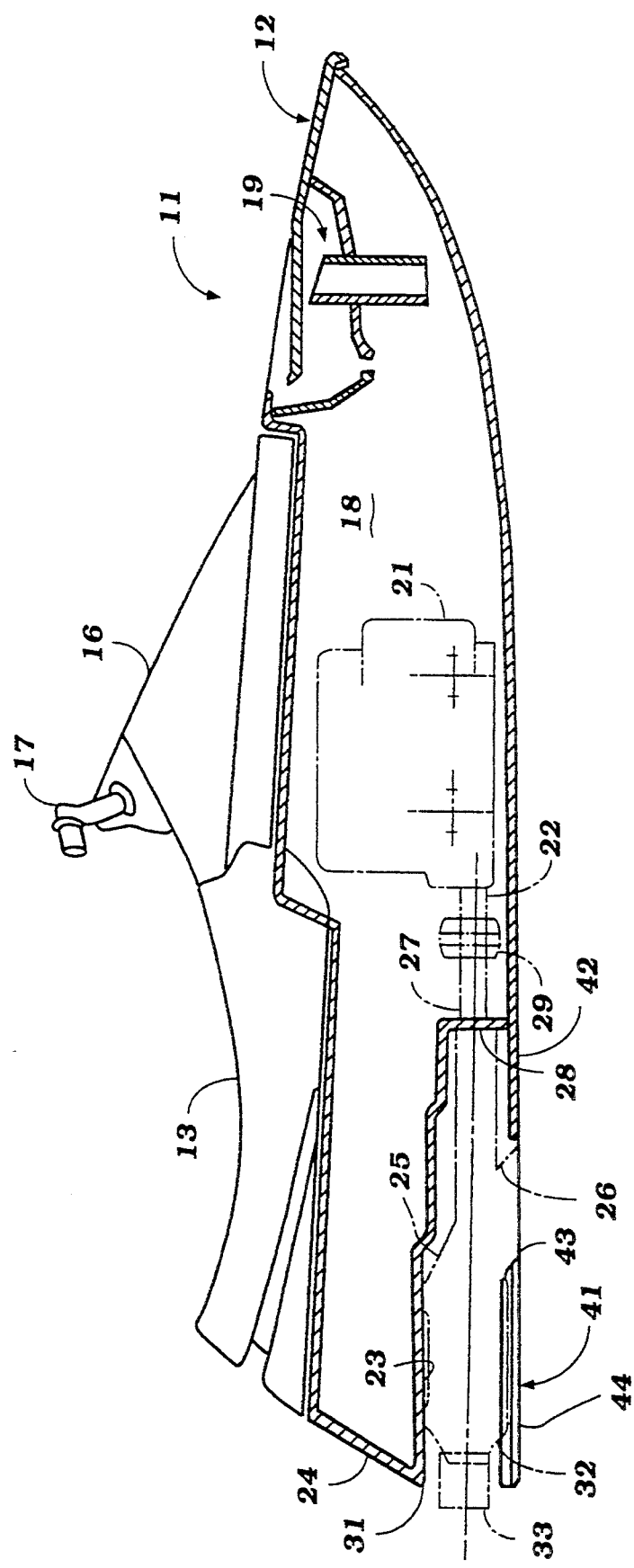
FIG. 1 is a side elevational view of a small watercraft embodying this invention, with a portion broken away and shown in sections.
Figure 2:
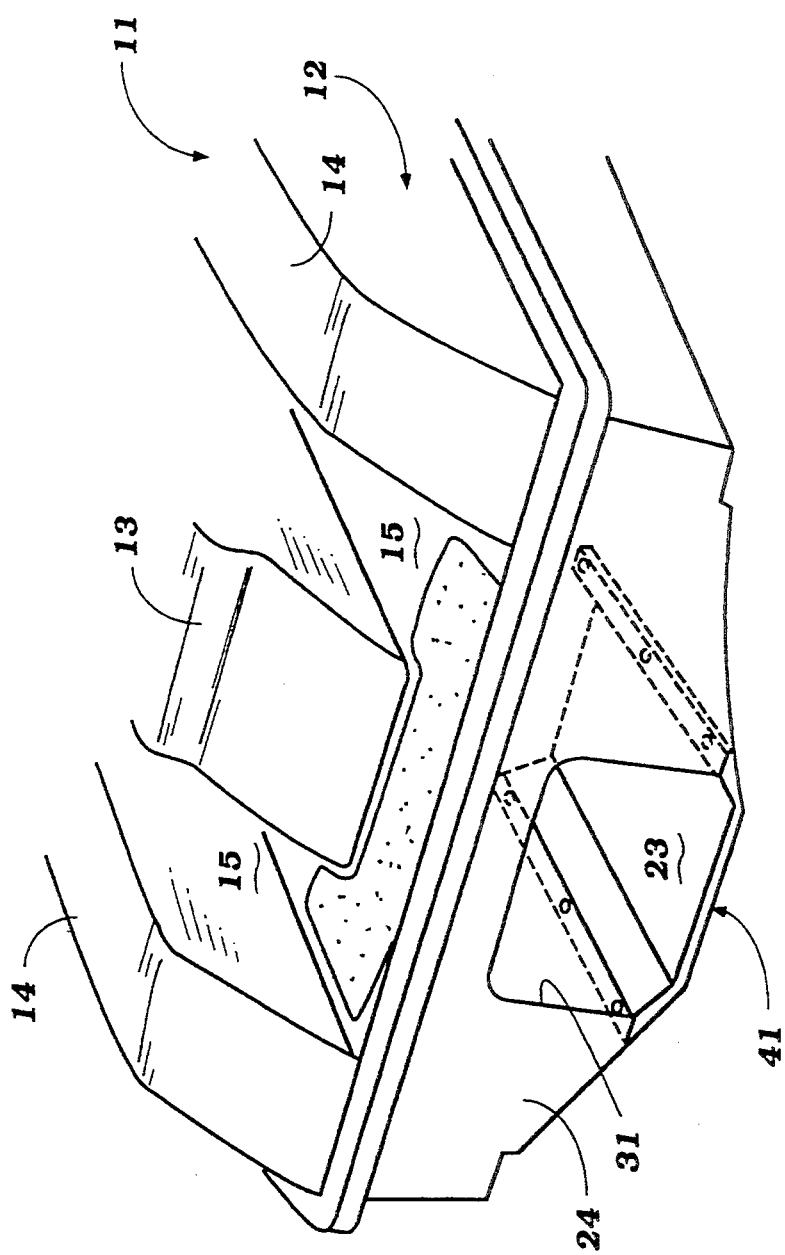
FIG. 2 is an enlarged rear perspective view.

Referring now in detail to the drawings and initially primarily to FIGS. 1 and 2, a small jet propelled watercraft constructed in accordance with a first embodiment of the invention is identified generally by the reference numeral 11. In the illustrated embodiment, the watercraft 11 is of the type commonly called a personal watercraft and is designed to be primarily operated by a single rider or a pair of riders seated in straddle tandem position. The watercraft is, as will become apparent, powered by a jet propulsion unit. It is to be understood that the illustrated environment is only typical of one of the many types of watercraft with which the invention may be practiced. The invention does have particular utility, however, in connection with jet propelled watercraft, for a reason which will become apparent.

The watercraft 11 is comprised of a hull, indicated generally by the reference numeral 12 which may be formed primarily from molded fiberglass reinforced resins or the like. The hull 12 has a passenger's area at its rear end at which a seat 13 is provided for accommodating one or more riders seated in straddle tandem fashion as aforenoted.

A pair of raised gunnels 14 are formed at opposite sides of the rear portion of the hull and define a pair of foot areas 15 into which the riders may place their feet. As may be readily seen in FIG. 2, the rear of the foot areas 15 are open through the rear of the transom to facilitate water drainage and also to permit ease of entry and exit of the watercraft 11 from the body of water in which the watercraft is operating.

A removable hatch cover 16 is positioned forwardly of the seat 13 and mounts a handlebar assembly 17 for control of the watercraft 11.

The hull 12 defines an engine compartment 18 beneath the hatch cover 16 and a vent arrangement, indicated generally by the reference numeral 19 is provided for venting the engine compartment. An internal combustion engine, shown in phantom and identified by the reference numeral 21 is mounted in the engine compartment 18 underneath the removable hatch 16 for powering the watercraft. The engine 21 has an output shaft 22.

A tunnel 23 is formed on the underside of the hull 12 rearwardly beneath the seat 13. This tunnel 23 opens through the rear of the transom 24 as clearly shown in FIG. 2. A jet propulsion unit, shown in phantom and identified by the reference numeral 25 is mounted within the tunnel 23 for propelling the watercraft 11. The jet propulsion unit 25 includes a downwardly facing water inlet opening 26 through which water is driven by an impeller (not shown) that is affixed to an impeller shaft 27 which extends forwardly through a bulkhead 28 from the tunnel 23 into the engine compartment 18. The impeller shaft is coupled by means of a flexible coupling 29 to the engine output shaft 22 for driving the impeller.

Water pumped by the impeller is discharged rearwardly through an opening 31 formed at the rear of the tunnel 23 in the transom 24 through a discharge nozzle portion 32 of the jet propulsion unit 25. A pivotally supported steering nozzle 33 is supported in registry with the discharge nozzle 32 and is steered by the handlebar assembly 17 for steering of the watercraft 11 in a well known manner.

The construction as thus far described may be considered to be conventional and, as aforenoted, is described only to permit those skilled in the art to understand the environment in which the invention may be employed.

Referring now to FIG. 3, a control and indicator box 34 is mounted on one side of the handlebar assembly 17 in a position to be readily viewed by the operator. The control and indicator box 34 includes an ignition switch 35 operated by a key 36, a fuel gage 37, a clock 38 and a speedometer 39. In addition, other gages and controls may be mounted on the control and indicator box 34 as should be readily apparent to those skilled in the art.

The invention deals with the speedometer 39 and particularly with the speed sensor associated therefor. The speedometer 39 has a display head which displays the speed signal in an analog fashion and also contains a pizzo electric device which converts a pressure signal, derived in a manner to be described, into a speed signal. This type of device is well known in the art.

The invention deals with the speed sensor and this speed sensor is mounted on a combined mounting and speed sensor plate, indicated generally by the reference numeral 41 which is mounted, in a manner to be described, across the rear lower most portion of the tunnel 23 adjacent the opening 31 and rearwardly of the jet propulsion unit water inlet opening 26. The forward edge of the mounting plate 41 and a rearwardly extending portion of the hull 42 define a water inlet opening 43 through which water may freely pass to the jet propulsion unit water inlet opening 26. It is to be understood that the forward edge of the plate 41 may be formed in any suitable shape and may, in fact, form more than just the rear edge of the opening 43. That is, a cutout may be formed in the forward end of the plate 41.

The construction of the plate 41 will now be described in conjunction with a first embodiment as shown in FIGS. 4 through 6 by particular reference to the figures. The plate 41 is preferably formed from a lightweight relatively rigid material such as aluminum or aluminum alloy. The plate 41 has a generally planer lower surface 44 which aligns with the lower hull portion 42 and a pair of angularly inclined side portions 45 that match the V shape of the hull 12 and which are formed with apertures 46 so as to pass suitable fasteners for fixing the plate 41 to the hull 12.

An upwardly extending projection 47 of the central rear portion of the plate part 44 forms a generally V shape groove 48 in the lower side of the plate 44. A pitot tube speed sensor 49 is mounted at the rear edge of this projection 47, as by welding, a threaded connection or any suitable other manner. The pitot tube 49 has a forwardly extending opening 51 which receives the dynamic water pressure as the watercraft 11 passes through the body of water in which the watercraft is operating. A flexible conduit 52 is affixed to the upper side of the pitot tube 49 in the area shown in FIG. 5 and extends forwardly to the speedometer 39 for transmitting the dynamic water pressure signal to it.

It should be noted that the pitot tube 49 is mounted in the recess 48 so that it will not extend below the lower edge surface 44 of the plate 41 and thus will be readily protected if the watercraft is beached of if under water obstacles are struck. Also, the pitot tube 49 may be easily removed for servicing by removing the plate 41. Although the pitot tube 49 is recessed, it still will be in a position so as to receive the dynamic water pressure and thus will provide a very good water pressure signal and speed signal.

A jet and speed sensor mounting plate constructed in accordance with another embodiment of the invention is shown in FIGS. 7 through 9 and is identified generally by the reference numeral 101. The construction and configuration of the plate 101 is generally the same as the preceding embodiment and, for that reason, portions of the plate 101 which are the same or substantially the same as the previously described embodiment have been identified by the same reference numerals and will be described again only insofar as is necessary to understand the construction and operation of this embodiment.

Basically, this embodiment differs from the previous embodiment only in the way the pitot tube speed sensor, indicated generally by the reference numeral 102 is mounted and protected. In this embodiment, the plate lower surface 44 is formed with a generally trapezoidal projection 103 that defines a lower surface 104 that tapers down from the rear end of the plate 101 to the forward end of the plate and which terminates just rear of the forward edge of the plate 101. A water opening 105 is formed in this surface 104.

The pitot tube 102 has a forwardly facing opening 106 that is mounted in a cavity 107 formed by the rib 103 and through which water may freely flow as the watercraft 11 moves through the body of water to exit through a rear opening 108. The upper end of the pitot tube 102 is, as in the previously described embodiment, adapted to receive a flexible conduit for transmitting the dynamic water pressure signal to the speedometer head 39. Again, the pitot tube 102 is mounted in a position whereby it will be protected if the watercraft is beached or if under water obstacles are struck and yet may be easily removed for servicing.

A combined jet and speed sensor mounting plate constructed in accordance with a third embodiment of the invention is illustrated in FIGS. 10 through 12 and is identified generally by the reference numeral 151. The plate 151 has a general configuration as with the previously described embodiments and, for that reason, these components have been identified by the same reference numerals and will be described again in detail only insofar as is necessary to understand the construction and operation of this embodiment.

In this embodiment, the rear underside of the plate portion 44 is formed with a small trapezoidal shape projection 152 that defines a forwardly facing generally plainer surface 153. A pitot tube like opening 154 is formed integrally in the projection 153 and has a small tube 155 affixed in a suitable manner to its upper end so as to accommodate a flexible conduit to transmit the dynamic water pressure signal from the pitot tube portion 154 to the forwardly positioned speedometer 39 (FIG. 3).

A combined jet and speed sensor mounting plate constructed in accordance with a forth embodiment of the invention is shown in FIGS. 13 through 15 and is identified generally by the reference numeral 201. The plate 201 has a construction substantially the same as the embodiment of FIGS. 10 through 12 and, for that reason, the reference numerals applied to describe the components of that embodiment are used in this embodiment and will not be described again, except insofar as is necessary to understand the construction and operation of this embodiment.

In this embodiment, in addition to the projection 152 that mounts and forms the speed sensor and pitot tube, there are provided a pair of side ribs 202 which extend from the forward edge of the plate portion 44 back toward and terminate on the sides of the projection 152. These additional ribs 202 will elevate the projection 152 when the watercraft is beached on a surface 203 as shown in FIG. 15 and thus provides the beaching protection of the other embodiments. It is to be understood that the embodiment of FIGS. 10 through 12 will provide some protection for beaching but if the watercraft is beached on a sandy area, the sand could enter pitot tube opening 154. That is not true with respect to this embodiment.

A jet and speed sensor mounting plate constructed in accordance with a fifth embodiment of the invention is identified generally by the reference numeral 251 and is shown in FIGS. 16 through 18. The plate 251 has a construction as like a conventional plate which is utilized to underlie jet propulsion units of the type generally shown in FIGS. 1 and 2. For that reason, components of the plate which are the same or substantially the same as the previously described embodiments have been identified by the same reference numerals. In this embodiment, a pitot tube type speed sensor 252 is mounted at the rear edge of the plate portion 44. The speed sensor 252 includes a mounting plate 253 having a pair of side flanges 254 that are affixed to the upper side of the plate portion 44 by threaded fasteners 255. A generally L shaped member 256 is pivotally mounted on the mounting bracket 253 by means of a pivot 257 and is held in its normal operating position by one or more tension springs 258. The L shaped member 256 has a pitot tube 259 molded integrally into it which defines a forwardly facing opening 261 that is adapted to receive the dynamic water pressure and to provide a speed signal. An upper end 262 of the pitot tube 259 is adapted to receive a flexible conduit (not shown) so as to transmit this pressure signal to the speedometer 39 as with the previously described embodiments.

In this embodiment, if the watercraft is beached, the L shaped member 252 can pivot upwardly about the pivot pin 257 against the action of the springs 258 and will be protected. In a similar manner, if an underwater obstacle is struck, the member 256 can again pivot upwardly for protection until the underwater obstacle is cleared.

It should be readily apparent that the foregoing description is that of preferred embodiments of the invention and that various changes and modifications may be made without departing from the spirit and scope of the invention as defined by the appended claims.

I claim:

1. A speed sensor arrangement for a jet propelled watercraft comprised of a hull having a passenger area containing a speed indicator, said hull further defining an area for receiving a water jet propulsion unit, a plate affixed to said hull and underlying at least in part said jet propulsion unit and having a generally planar undersurface, and a speed sensor affixed to said plate at the rear end thereof, and means for transmitting a speed signal from said speed sensor to said speed indicator for indicating the speed of said watercraft, said speed sensor having a forwardly extending tubular portion adapted to receive dynamic water pressure and which tubular portion extends below said planar undersurface and within a recess formed in said plate by a rib which extends vertically downwardly from the planar undersurface of said plate and below said tubular portion for protecting said tubular portion from impact with foreign objects, and an opening in the lower surface of said rib for admitting water to said tubular portion.

2. A speed sensor arrangement for a jet propelled watercraft comprised of a hull having a passenger area containing a speed indicator, said hull further defining an area for receiving a water jet propulsion unit, a plate affixed to said hull and underlying at least in part said jet propulsion unit, and a speed sensor affixed to said plate at the rear end thereof, and means for transmitting a speed signal from said speed sensor to said speed indicator for indicating the speed of said watercraft, said speed sensor having a forwardly extending tubular portion adapted to receive dynamic water pressure and which tubular portion is mounted within a V shaped recess formed in the lower surface of said plate and tapering in a forward direction.

3. A speed sensor arrangement for a jet propelled watercraft comprised of a hull having a passenger area containing a speed indicator, said hull further defining an area for receiving a water jet propulsion unit, a plate affixed to said hull and underlying at least in part said jet propulsion unit and having a generally planar undersurface, a speed sensor affixed to said plate at the rear end thereof, and means for transmitting a speed signal from said speed sensor to said speed indicator for indicating the speed of said watercraft, said speed sensor having a forwardly extending tubular portion adapted to receive dynamic water pressure and which tubular portion extends in a first rib that extends below said planar undersurface and within a recess formed in said plate between a pair of undersurfaces which extend vertically downwardly from the planar undersurface of said plate and below said tubular portion for protecting said tubular portion from impact with foreign objects, said recess being formed by a pair of spaced apart ribs which extend below said first rib for protecting said first rib upon beaching.

4. A speed sensor arrangement as set forth in claim 1 wherein the hull defines a tunnel at the rear end thereof and the plate spans the rear end of the tunnel.

5. A speed sensor arrangement as set forth in claim 2 wherein the hull defines a tunnel at the rear end thereof and the plate spans the rear end of the tunnel.

6. A speed sensor arrangement as set forth in claim 2 wherein the plate defines at least in part an opening through which water may flow to a downwardly facing water inlet opening formed by the water jet propulsion unit.

* * * * *